(12) United States Patent  
Matsuzawa

(10) Patent No.: US 11,862,193 B2
(45) Date of Patent: Jan. 2, 2024

(54) MAGNETIC DISK DEVICE AND PARAMETER SETTING METHOD OF MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takuji Matsuzawa, Kashiwa Chiba (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/893,764

(22) Filed: Aug. 23, 2022

(65) Prior Publication Data

US 2023/0238031 A1    Jul. 27, 2023

(30) Foreign Application Priority Data

Jan. 21, 2022   (JP) .................................. 2022-008025

(51) Int. Cl.
    *G11B 20/10*  (2006.01)
(52) U.S. Cl.
    CPC .............................. *G11B 20/10194* (2013.01)
(58) Field of Classification Search
    None
    See application file for complete search history.

(56) References Cited

U.S. PATENT DOCUMENTS

| | | | |
|---|---|---|---|
| 6,580,579 B1 | 6/2003 | Hsin et al. | |
| 6,636,376 B1 | 10/2003 | Ho | |
| 7,864,484 B2 | 1/2011 | Kisaka et al. | |
| 9,053,726 B1* | 6/2015 | Kim | G11B 5/59622 |
| 9,536,553 B1* | 1/2017 | Seo | G11B 5/5582 |
| 9,678,103 B2 | 6/2017 | Abramovitch et al. | |
| 2002/0093754 A1* | 7/2002 | Zhang | G11B 21/21 |
| 2008/0024906 A1* | 1/2008 | Takaishi | G11B 7/0953 |
| | | | 360/77.02 |
| 2009/0180368 A1* | 7/2009 | Miyashita | G11B 20/10009 |
| | | | 375/226 |
| 2012/0087031 A1* | 4/2012 | Goker | G11B 5/584 |
| | | | 360/39 |
| 2018/0090163 A1* | 3/2018 | Park | G11B 5/59694 |
| 2021/0366512 A1* | 11/2021 | Calfee | G11B 5/5547 |
| 2022/0084552 A1* | 3/2022 | Matsuzawa | G11B 5/59622 |
| 2023/0238031 A1* | 7/2023 | Matsuzawa | G11B 20/10194 |
| | | | 360/55 |

FOREIGN PATENT DOCUMENTS

JP         6105881 B2     3/2017

* cited by examiner

*Primary Examiner* — Peter Vincent Agustin
(74) *Attorney, Agent, or Firm* — Kim & Stewart LLP

(57) ABSTRACT

According to one embodiment, a magnetic disk device comprises an actuator, a controller that controls the actuator, a loop shaping filter connected in parallel with the controller, the loop shaping filter having a parameter for suppressing a rotation asynchronous disturbance affecting the actuator, the parameter of the loop shaping filter being determined using a transfer function from an output of the loop shaping filter to before an input of the rotation asynchronous disturbance, and a notch filter that suppresses mechanical resonance of the actuator.

4 Claims, 4 Drawing Sheets

MAGNETIC DISK DEVICE AND PARAMETER SETTING METHOD OF MAGNETIC DISK DEVICE

CROSS-REFERENCE TO RELATED APPLICATIONS

This application is based upon and claims the benefit of priority from Japanese Patent Application No. 2022-008025 filed Jan. 21, 2022, the entire contents of which are incorporated herein by reference.

FIELD

Embodiments described herein relate generally to a magnetic disk device and a parameter setting method of the magnetic disk device.

BACKGROUND

In a magnetic disk device mounted on a server or the like, positioning accuracy of a magnetic head with respect to a magnetic disk deteriorates due to a rotation asynchronous disturbance (nonrepeatable runout (NRRO)) such as vibration by a fan of a server rack. In order to improve the positioning accuracy, a method of adding a filter (loop shaping filter) for an NRRO (rotation asynchronous disturbance) to a normal feedback system has been known as one of techniques for suppressing the NRRO. This filter is designed such that a disturbance estimate value to suppress the disturbance, which is estimated from a position error signal cancels the disturbance in consideration of a change in gain and phase that occurs until a signal input as a filter output reaches a point where the disturbance is input. In addition, the magnetic head includes an actuator that moves the magnetic head to a predetermined position on the magnetic disk, and a notch filter is employed to suppress mechanical resonance (mechanical characteristics) of the actuator.

DETAILED DESCRIPTION

Figure 1:
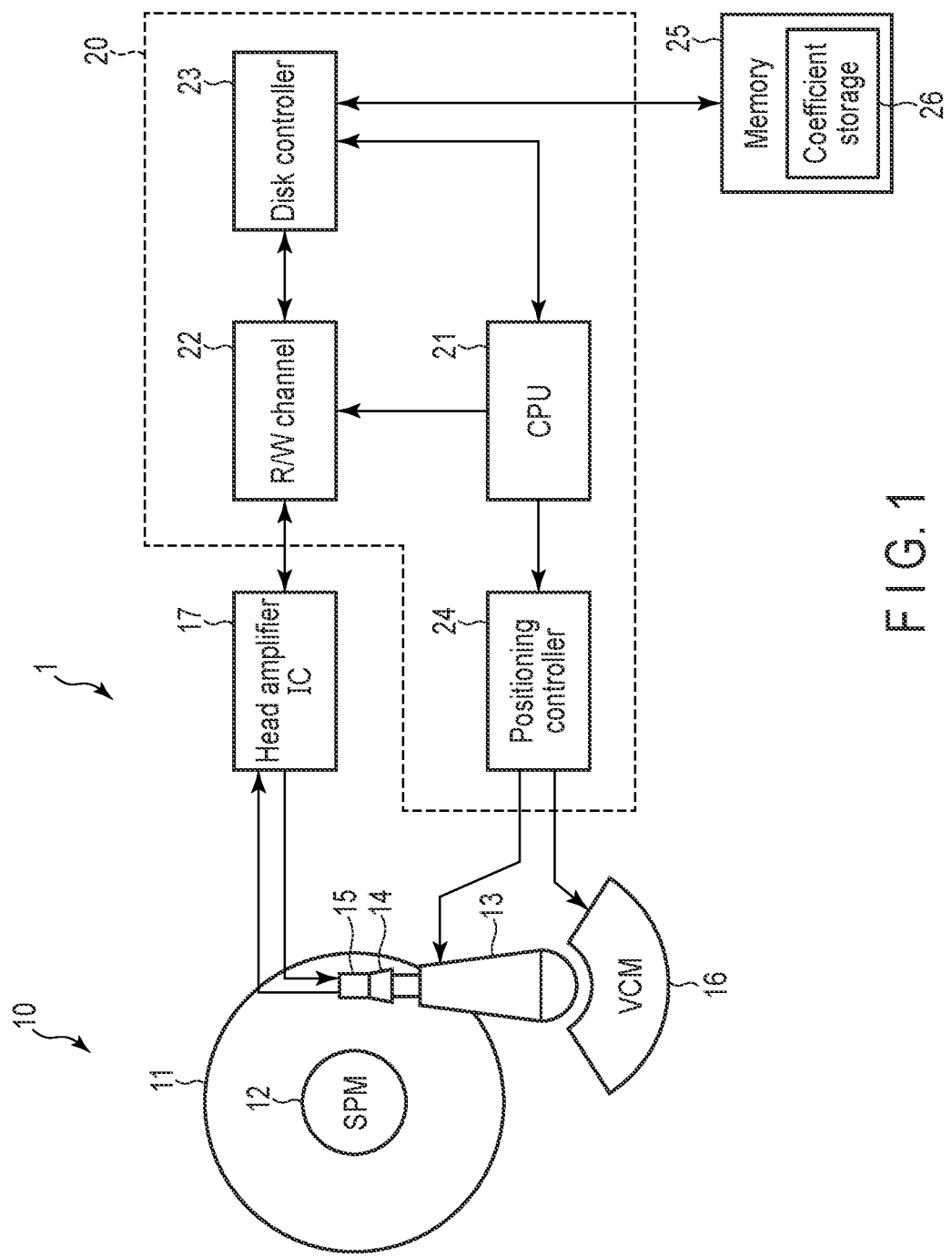
FIG. 1 is a block diagram illustrating an example of a configuration of a magnetic disk device according to an embodiment.

In general, according to one embodiment, a magnetic disk device comprises an actuator, a controller that controls the actuator, a loop shaping filter connected in parallel with the controller, the loop shaping filter having filter coefficients for suppressing a rotation asynchronous disturbance affecting a position of the actuator, the filter coefficients of the loop shaping filter being determined using a transfer function from an output of the loop shaping filter to before an input of the rotation asynchronous disturbance, and a notch filter that suppresses mechanical resonance of the actuator, wherein a parameter of the notch filter is changed according to the frequency response of the actuator, the frequency response of the actuator being changed under an influence of manufacturing variations and the like, and simultaneously the loop shaping filter is redesigned by reflecting a change in the transfer function.

In a magnetic disk device, the frequency response of an actuator is affected by manufacturing variations of components or the like and is different from the one used at a previous design time. This requires a change in a parameter of a notch filter that suppresses vibration of the actuator from the design time. However, the change in the parameter of the notch filter affects disturbance suppression performance of a loop shaping filter that suppresses a rotation asynchronous disturbance (NRRO).

An object of embodiments is to provide a magnetic disk device and a parameter setting method of the magnetic disk device capable of, even when the frequency response of an actuator is different from the one used at a design time, suppressing the NRRO as intended and improving the positioning accuracy of a magnetic head.

Hereinafter, embodiments will be described with reference to the drawings. Note that the disclosure is merely an example, and the invention is not limited by the contents described in the following embodiments. Modifications easily conceivable by those skilled in the art are naturally included in the scope of the disclosure. In the drawings, in order to make the description clearer, the sizes, shapes, and the like of parts may be schematically represented with a change with respect to an actual embodiment. In the drawings, corresponding elements may be denoted by the same reference numerals, and may not be described in detail.

EMBODIMENT

FIG. 1 is a block diagram illustrating an example of a configuration of a magnetic disk device 1.

The magnetic disk device 1 includes a head disk assembly (HDA) 10, a head amplifier integrated circuit (hereinafter, head amplifier IC) 17, and a system-on-chip (SOC) 20.

The HDA 10 includes a magnetic disk 11, a spindle motor (SPM) 12, an arm 13, and a voice coil motor (VCM) 16. The SPM 12 rotates the magnetic disk 11. A load beam 14 is attached to a distal end of the arm 13, and a magnetic head 15 is attached to a distal end of the load beam 14. The arm 13 is driven by the VCM 16, and controls the magnetic head 15 to move it to a designated position on the magnetic disk 11.

The magnetic head 15 has a structure in which a read head element and a write head element are separately mounted on one slider. The read head element reads data recorded on the magnetic disk 11. The write head element writes data to the magnetic disk 11.

The head amplifier IC 17 includes a read amplifier and a write driver. The read amplifier amplifies a read signal read by the read head element and transmits the amplified read signal to a read/write (R/W) channel 22. Meanwhile, the write driver transmits a write current corresponding to write data output from the R/W channel 22 to the write head element.

The SOC 20 includes a microprocessor (CPU) 21, the R/W channel 22, a disk controller 23, and a positioning controller 24. The CPU 21 is a main controller of a drive. The CPU 21 executes servo control for positioning the magnetic head 15 via the positioning controller 24, and data read/write control via the head amplifier IC 17. The R/W channel 22 includes a read channel for executing signal processing of read data, and a write channel for executing signal processing of write data. The disk controller 23 executes interface control for controlling data transfer between a host system (not illustrated) and the R/W channel 22. Note that the positioning controller 24 may be implemented as hardware or software (firmware).

A memory 25 includes a volatile memory and a nonvolatile memory. For example, the memory 25 includes a buffer memory including a DRAM, and a flash memory. The memory 25 includes, as the nonvolatile memory, a storage (not illustrated) that stores programs and the like necessary for the processing of the CPU 21, and a coefficient storage 26 that stores parameters when a parameter setting process described later is performed. The parameters stored in the coefficient storage 26 will be described later. Note that the coefficient storage 26 may be stored in any storage area in the magnetic disk device 1 if not stored in the memory 25.

Here, a technique related to a loop shaping filter that suppresses the NRRO will be described with reference to FIGS. 2A and 2B.

Figure 2A:
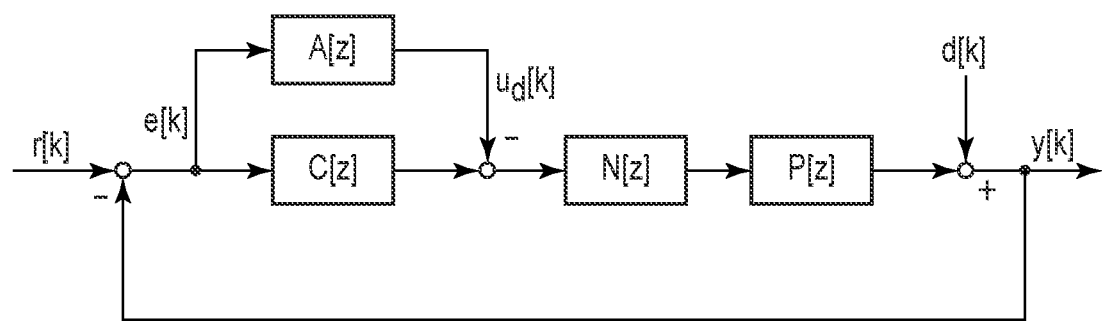
FIGS. 2A and 2B are block diagrams illustrating a configuration of a control system for suppressing a disturbance according to the embodiment in comparison with a conventional configuration.
Figure 2B:
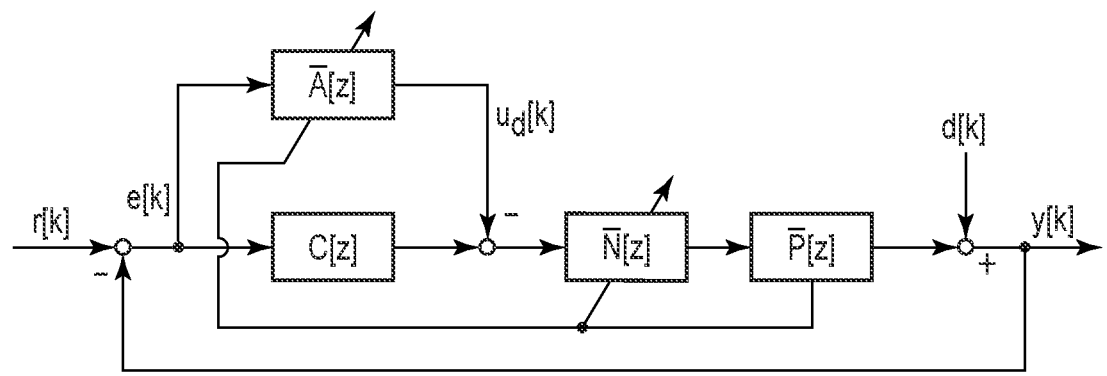

FIGS. 2A and 2B are block diagrams illustrating configurations of a control system for suppressing the disturbance in comparison. FIG. 2A is a conventional configuration, and FIG. 2B is a configuration according to the embodiment. In FIGS. 2A and 2B, reference numeral 30 denotes a controller (C[z]), reference numeral 40 denotes a loop shaping filter (A[z], $\overline{A}[z]$), reference numeral 50 denotes an actuator (P[z], $\overline{P}[z]$), and reference numeral 60 denotes a notch filter (N[z], $\overline{N}[z]$). At this time, a reference signal is represented by r[k], a position signal is represented by y[k], an output of the loop shaping filter 40 is represented by $u_d[k]$, and the disturbance is represented by d[k].

The loop shaping filter 40 is disposed in parallel with the controller 30, and a combined output thereof is input to the actuator 50 via the notch filter 60, so that the actuator 50 operates. In this manner, the output of the loop shaping filter 40 is reflected and filtering of the notch filter 60 is applied to operate the actuator 50, resulting in control that cancels the influence of the disturbance.

Specifically, in the magnetic disk device 1 of the present embodiment, the controller 30, the loop shaping filter 40, and the notch filter 60 are included in the positioning controller 24, and the actuator 50 corresponds to the VCM 16. Note that, when the magnetic disk device is a type in which a microactuator is mounted on the magnetic head to minutely operate the write element and the read element, the microactuator may also be included in the actuator together with the VCM 16.

In the above configuration, the following Formula (1) is used as the loop shaping filter (A[z]) 40 disposed in parallel with the controller (C[z]) 30.

$$A[z] = \frac{\mu}{2} \frac{z^2 \cos\phi - \eta z \cos(\omega_0 T + \phi)}{z^2 - 2\eta z \cos\omega_0 T + \eta^2} \quad (1)$$

where T is a sampling period, and η, μ, and $\omega_0$ are design parameters.

Furthermore, parameters α and φ in the coefficients of the loop shaping filter (A[z]) 40 are expressed by the following Formula (2).

$$M_{u_d d}[z] := \frac{P[z]N[z]}{1 + P[z]N[z]C[z]}, \alpha = |M_{u_d d}[e^{j\omega_0 T}]|, \phi = \arg(M_{u_d d}[e^{j\omega_0 T}]) \quad (2)$$

where the parameters α and φ are parameters for matching a gain (α) and a phase (φ) of a transfer function $$M_{u_d d}[z]$$

from the output $u_d[k]$ of the loop shaping filter (A[z]) 40 to before an input of the disturbance d[k] at a suppression target angular frequency $\omega_0$. That is, designing the parameters α and φ means designing the loop shaping filter such that an estimate value for suppressing the disturbance d[k] estimated from a position error signal by the loop shaping filter (A[z]) 40 cancels the disturbance d[k] in consideration of a change in the gain (α) and the phase (φ) that occurs until the signal $u_d[k]$ output from the loop shaping filter (A[z]) 40 reaches the point where the disturbance d[k] is input.

For example, in a case of designing the control system including the notch filter (N[z]) 60, the controller (C[z]) 30, and the like for the nominal actuator (P[z]) 50, the notch filter 60 is changed later from N[z] to $\overline{N}[z]$ according to a change of the actuator ($\overline{P}[z]$) 50 of the actual head. At this time, the transfer function $$M_{u_d d}[z]$$

from output $u_d[k]$ of the loop shaping filter (A[z]) 40 to before the input of the disturbance d[k] changes, resulting in failure to obtain desired characteristics.

Thus, in the embodiment, as illustrated in FIG. 2B, when the actuator 50 is changed from design-time P[z] to $\overline{P}[z]$, the notch filter 60 is changed from N[z] to $\overline{N}[z]$ according to the change of the actuator 50, and simultaneously, the loop shaping filter 40 is changed from A[z] to $\overline{A}[z]$.

Figure 3:
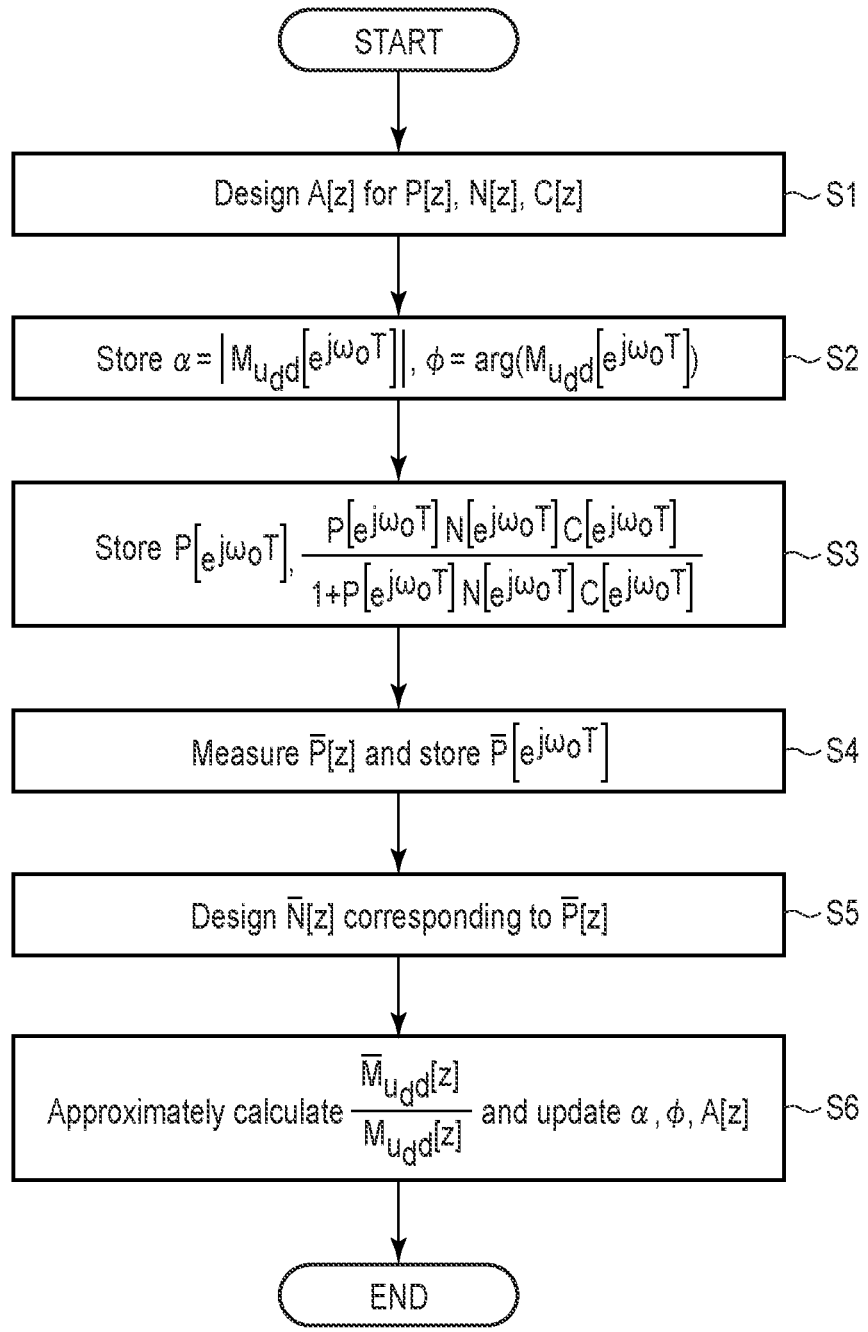
FIG. 3 is a flowchart illustrating an example of a main flow of a parameter setting process according to the embodiment.

FIG. 3 is a flowchart illustrating an example of a main flow of a filter coefficient (parameter) setting process according to the embodiment.

First, at the design time in the beginning of manufacture, the parameters of the loop shaping filter (A[z]) 40 are designed for P[z], N[z], and C[z] of the actuator 50, the notch filter 60, and the controller 30 (step S1). Then, the gain a and the phase φ of the transfer function $$M_{u_d d}[z]$$

at the suppression target angular frequency $\omega_0$ of the loop shaping filter (A[z]) 40, which are expressed by Formula 2, are stored (step S2).

Subsequently, a frequency response $P[e^{j\omega_0 T}]$ of the actuator 50 at the suppression target angular frequency $\omega_0$ and $P[e^{j\omega_0 T}]N[e^{j\omega_0 T}]C[e^{j\omega_0 T}]/(1+P[e^{j\omega_0 T}]N[e^{j\omega_0 T}]C[e^{j\omega_0 T}])$ are stored (step S3). $\overline{P}[z]$ is measured and $\overline{P}[e^{j\omega_0 T}]$ is stored (step S4), and $\overline{N}[z]$ corresponding to $\overline{P}[z]$ is designed (step S5). Here, a ratio $$\overline{M}_{u_d d}[z]/M_{u_d d}[z]$$

before and after parameter change of the notch filter 60 is approximately calculated, and α, φ, and A[z] are updated (step S6). Then, the series of processing ends.

As described above, in the present embodiment, when the change in the notch filter 60 from $N[z]$ to $\overline{N}[z]$ according to individual mechanical characteristics causes the change in the transfer function $$\overline{M}_{u_d d}[z],$$

reflecting the change in the notch filter 60 and the like in the original parameters $\alpha$ and $\varphi$ allows for obtaining desired characteristics.

Specifically, when $$\overline{M}_{u_d d}[z],$$

$\alpha$, and $\varphi$ after the parameter change of the notch filter 60 are defined as $$\overline{M}_{u_d d}[z],$$

$\overline{\alpha}$ and $\overline{\varphi}$, respectively, they are expressed by the following Formula (3).

$$\overline{\alpha} = \alpha \left| \frac{\overline{M}_{u_d d}[e^{j\omega_0 T}]}{M_{u_d d}[e^{j\omega_0 T}]} \right|, \quad (3)$$

$$\overline{\phi} = \phi + \arg\left( \frac{\overline{M}_{u_d d}[e^{j\omega_0 T}]}{M_{u_d d}[e^{j\omega_0 T}]} \right),$$

$$\frac{\overline{M}_{u_d d}[z]}{M_{u_d d}[z]} = \frac{\overline{P}[z]\overline{N}[z](1 + P[z]N[z]C[z])}{P[z]N[z](1 + \overline{P}[z]\overline{N}[z]C[z])}$$

The design-time notch filter 60 is expressed by the following Formula (4).

$$N[z] = \prod_{i=1}^{n} \frac{\left(\frac{2(z-1)}{T(z+1)}\right)^2 + 2d_{p_i}\zeta_i\omega_{np_i}\frac{2(z-1)}{T(z+1)} + \omega_{np_i}^2}{\left(\frac{2(z-1)}{T(z+1)}\right)^2 + 2\zeta_i\omega_{np_i}\frac{2(z-1)}{T(z+1)} + \omega_{np_i}^2} \quad (4)$$

$$\omega_{np_i} = \frac{2}{T}\arctan\left(\frac{\omega_{n_i}T}{2}\right)$$

where $d_{p_i}$, $\zeta_i$, and $\omega_{np_i}$ are a depth, an attenuation, and a suppression target angular frequency, respectively, of the design-time notch filter 60 parameters. From the above formulas, the ratio $$\overline{M}_{u_d d}[z]/M_{u_d d}[z]$$

before and after the change in the transfer function is as the following Formula (5).

$$\frac{\overline{M}_{u_d d}[z]}{M_{u_d d}[z]} = \frac{\overline{P}[z]}{P[z]} \frac{\overline{N}[z]}{N[z]} \left[ 1 + \frac{P[z]N[z]C[z]\left[\frac{\overline{P}[z]}{P[z]}\frac{\overline{N}[z]}{N[z]} - 1\right]}{1 + P[z]N[z]C[z]} \right]^{-1} \quad (5)$$

where $\overline{P}[e^{j\omega_0 T}]/P[e^{j\omega_0 T}]$ can be acquired by actual measurement at the time of the parameter change of the notch filter 60. In addition, $P[e^{j\omega_0 T}]N[e^{j\omega_0 T}]C[e^{j\omega_0 T}]/(1+P[e^{j\omega_0 T}]N[e^{j\omega_0 T}]C[e^{j\omega_0 T}])$ can be obtained at the design time. Let they be Q and R, respectively. Then, $$\overline{M}_{u_d d}[e^{j\omega_0 T}]/M_{u_d d}[e^{j\omega_0 T}]$$

becomes a function of $\overline{N}[e^{j\omega_0 T}]/N[e^{j\omega_0 T}]$ as in the following Formula (6).

$$\frac{\overline{M}_{u_d d}[e^{j\omega_0 T}]}{M_{u_d d}[e^{j\omega_0 T}]} = Q\frac{\overline{N}[e^{j\omega_0 T}]}{N[e^{j\omega_0 T}]} \left[ 1 + R\left( Q\frac{\overline{N}[e^{j\omega_0 T}]}{N[e^{j\omega_0 T}]} - 1 \right) \right]^{-1} \quad (6)$$

As described above, according to the present embodiment, when the parameters of the notch filter are changed according to the actuator, the loop shaping filter is redesigned (adjusted) by reflecting the change in the transfer function. Therefore, it is possible to improve the positioning accuracy of the magnetic head while suppressing the rotation asynchronous disturbance even when the actuator 50 is different from that at the design time.

Hereinafter, examples of a calculation method for the parameter setting (change) in the above configuration will be described.

Example 1

In Formula (6), $\overline{N}[e^{j\omega_0 T}]/N[e^{j\omega_0 T}]$ may be calculated from $N[e^{j\omega_0 T}]$ obtained in advance and $\overline{N}[e^{j\omega_0 T}]$ obtained after the parameter change.

Example 2

An approximate expression such as the following Formula (7) may be used as $\overline{N}[e^{j\omega_0 T}]/N[e^{j\omega_0 T}]$.

$$\frac{\overline{N}[e^{j\omega_0 T}]}{N[e^{j\omega_0 T}]} = \prod_{i=1}^{n} \frac{\left(\frac{2(z-1)}{T(z+1)}\right)^2 + 2\overline{d}_{p_i}\overline{\zeta}_i\omega_{np_i}\frac{2(z-1)}{T(z+1)} + \overline{\omega}_{np_i}^2}{\left(\frac{2(z-1)}{T(z+1)}\right)^2 + 2\overline{\zeta}_i\overline{\omega}_{np_i}\frac{2(z-1)}{T(z+1)} + \overline{\omega}_{np_i}^2} \quad (7)$$

$$\frac{\left(\frac{2(z-1)}{T(z+1)}\right)^2 + 2\zeta_i\omega_{np_i}\frac{2(z-1)}{T(z+1)} + \omega_{np_i}^2}{\left(\frac{2(z-1)}{T(z+1)}\right)^2 + 2d_{p_i}\zeta_i\omega_{np_i}\frac{2(z-1)}{T(z+1)} + \omega_{np_i}^2} \approx$$

$$\prod_{i=1}^{n} \frac{\overline{\omega}_{n_i}^2 - \omega_0^2 + 2j\overline{d}_{p_i}\overline{\zeta}_i\overline{\omega}_{n_i}\omega_0}{\overline{\omega}_{n_i}^2 - \omega_0^2 + 2j\overline{\zeta}_i\overline{\omega}_{n_i}\omega_0} \frac{\omega_{n_i}^2 - \omega_0^2 + 2j\zeta_i\omega_{n_i}\omega_0}{\omega_{n_i}^2 - \omega_0^2 + 2jd_{p_i}\zeta_i\omega_{n_i}\omega_0} \approx$$

$$\prod_{i=1}^{n} \left[ 1 + (\overline{d}_{p_i} - d_{p_i})f_1(d_{p_i}, \zeta_i, \Omega_i) + (\overline{\zeta}_i - \zeta_i)g_1(d_{p_i}, \zeta_i, \Omega_i) + (\overline{\Omega}_i - \Omega_i)h_1(d_{p_i}, \zeta_i, \Omega_i) \right]$$

In Formula (7), $f_1(d_{p_i}, \zeta_i, \Omega_i)$, $g_1(d_{p_i}, \zeta_i, \Omega_i)$, and $h_1(d_{p_i}, \zeta_i, \Omega_i)$ can be calculated using a Taylor series or the like in advance at the design time. Thus, Formula (7) can be easily calculated by the sum of products with parameter differences.

Here, $\Omega_i := \omega_{ni}/\omega_0$, and n is the number of stages of the notch filter.

Figure 4:
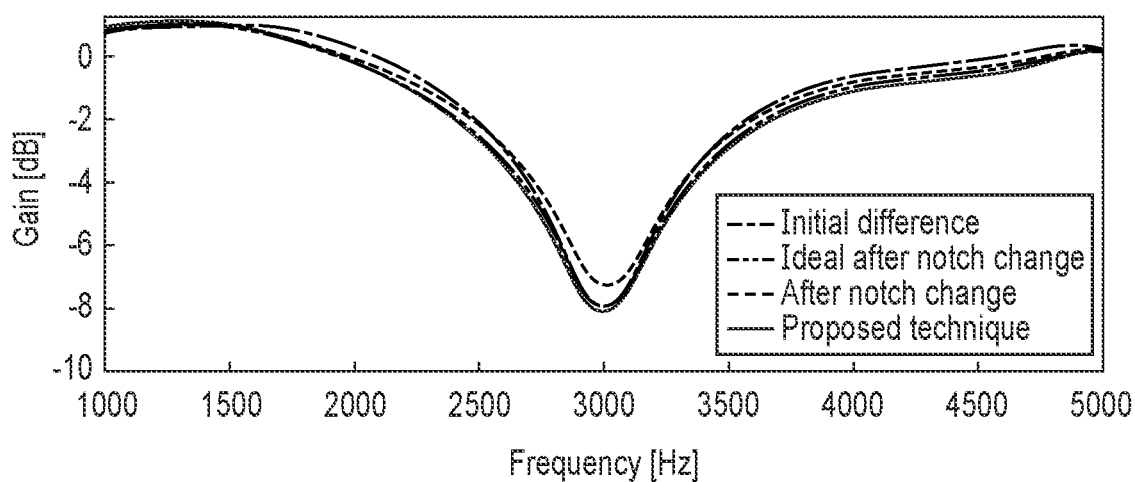
FIG. 4 is a diagram illustrating a result of comparing sensitivity function differences with/without loop shaping when only a notch filter is changed in Example 2 according to the embodiment.

FIG. 4 illustrates a result of comparing sensitivity function differences with/without loop shaping when only the notch filter 60 is changed using the present example. In FIG. 4, "initial difference" indicates a case before the notch filter is changed, "ideal after notch change" indicates a case where the loop shaping filter is recalculated by the normal method after the notch filter is changed (ideal after the notch filter is changed), "after notch change" indicates a case where the loop shaping filter is not updated after the notch filter is changed, and "proposed technique" indicates a case where the loop shaping filter is updated using the proposed technique of Example 2 after the notch filter is changed. As can be seen from FIG. 4, the approximation by the proposed technique yields loop shaping close to the ideal after notch change.

Example 3

For a region where the angular frequency $\omega_0$ is low, $$|1+P[e^{j\omega_0 T}]N[e^{j\omega_0 T}]C[e^{j\omega_0 T}]|^{-1} \ll |P[e^{j\omega_0 T}]N[e^{j\omega_0 T}]| \quad (8)$$

holds, and thus, $$\bar{\alpha} \simeq \alpha |Q| \left| \frac{\bar{N}[e^{j\omega_0 T}]}{N[e^{j\omega_0 T}]} \right|, \quad (9)$$

$$\bar{\phi} = \phi + \arg(Q) + \arg\left( \frac{\bar{N}[e^{j\omega_0 T}]}{N[e^{j\omega_0 T}]} \right).$$

At this time, $$\left| \frac{\bar{N}[e^{j\omega_0 T}]}{N[e^{j\omega_0 T}]} \right| \quad (10)$$

can be approximated by the following Formula (12), and $$\arg\left( \frac{\bar{N}[e^{j\omega_0 T}]}{N[e^{j\omega_0 T}]} \right) \quad (11)$$

can be approximated by the following Formula (13).

$$\left| \frac{\bar{N}[e^{j\omega_0 T}]}{N[e^{j\omega_0 T}]} \right| \simeq \prod_{i=1}^{n} \{1 + f_2(d_{p_i}, \zeta_i, \Omega_i)(\bar{d}_{p_i} - d_{p_i}) + g_2(d_{p_i}, \zeta_i, \Omega_i)(\bar{\zeta}_i - \zeta_i) + h_2(d_{p_i}, \zeta_i, \Omega_i)(\bar{\Omega}_i - \Omega_i)\} \quad (12)$$

$$\arg\left( \frac{\bar{N}[e^{j\omega_0 T}]}{N[e^{j\omega_0 T}]} \right) \simeq \sum_{i=1}^{n} \{-f_3(d_{p_i}, \zeta_i, \Omega_i)(\bar{d}_{p_i} - d_{p_i}) - g_3(d_{p_i}, \zeta_i, \Omega_i)(\bar{\zeta}_i - \zeta_i) - h_3(d_{p_i}, \zeta_i, \Omega_i)(\bar{\Omega}_i - \Omega_i)\} \quad (13)$$

In Formulas (12) and (13), $$f_1(d_{p_i},\zeta_i,\Omega_i), g_1(d_{p_i},\zeta_i,\Omega_i), h_1(d_{p_i},\zeta_i,\Omega_i), i=2,3 \quad (14)$$

can be calculated using a Taylor series or the like in advance at the design time. Thus, Formulas (12) and (13) can be easily calculated by the sum of products with the parameter differences.

Example 4

The relationship between setting values and resetting values for each of the actuator 50 and the notch filter 60 may be given as follows:

$$\bar{P}[e^{j\omega_0 T}] \simeq P[e^{j\omega_0 T}] \quad (15)$$

$$\bar{N}[e^{j\omega_0 T}] \simeq N[e^{j\omega_0 T}].$$

Some embodiments of the present invention have been described. However, these embodiments are presented as examples, and are not intended to limit the scope of the invention. These novel embodiments can be implemented in various other forms, and various omissions, substitutions, and modifications can be made without departing from the gist of the invention. These embodiments and variations thereof are included in the scope and gist of the invention, and are included in the invention described in the claims and the equivalent scope thereof.

What is claimed is:

1. A magnetic disk device comprising:
   an actuator;
   a controller that controls the actuator;
   a loop shaping filter connected in parallel with the controller, the loop shaping filter having a parameter for suppressing a rotation asynchronous disturbance affecting the actuator, the parameter of the loop shaping filter being determined using a transfer function from an output of the loop shaping filter to before an input of the rotation asynchronous disturbance; and
   a notch filter that suppresses mechanical resonance of the actuator, wherein
   a parameter of the notch filter is changed according to a change in the actuator, and simultaneously the loop shaping filter is redesigned by reflecting a change in the transfer function.

2. The magnetic disk device according to claim 1, wherein the change in the transfer function is replaced with an approximate expression.

3. The magnetic disk device according to claim 1, wherein initial design-time information of the actuator, the notch filter, and the controller is held and used as a comparison target for obtaining the change in the transfer function.

4. A parameter setting method of a magnetic disk device used for the magnetic disk device comprising:
   an actuator;
   a controller that controls the actuator;
   a loop shaping filter connected in parallel with the controller, the loop shaping filter having a parameter for suppressing a rotation asynchronous disturbance affecting the actuator, the parameter of the loop shaping filter being determined using a transfer function from an output of the loop shaping filter to before an input of the rotation asynchronous disturbance; and
   a notch filter that suppresses mechanical resonance of the actuator,
   the parameter setting method comprising:
   changing a parameter of the notch filter according to a change in the actuator, and simultaneously redesigning the parameter of the loop shaping filter by reflecting a change in the transfer function.

\* \* \* \* \*